Sept. 23, 1947.  E. GISONDI  2,427,959
NAIL
Filed Oct. 25, 1944
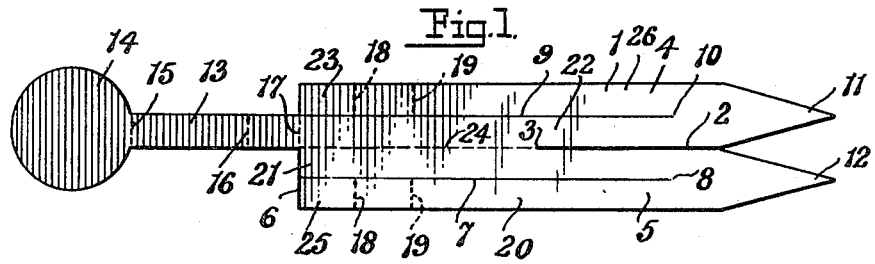
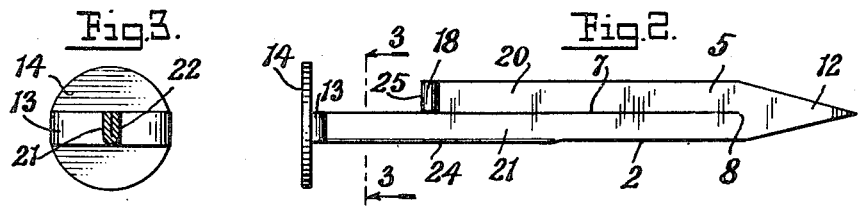
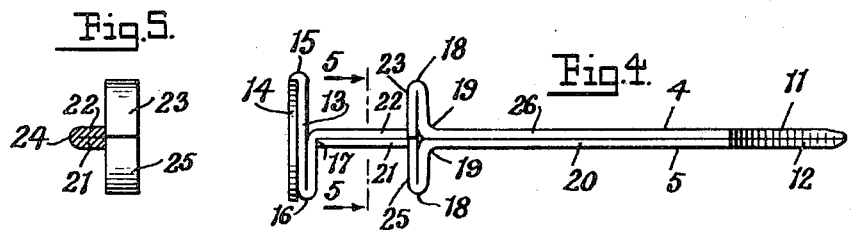
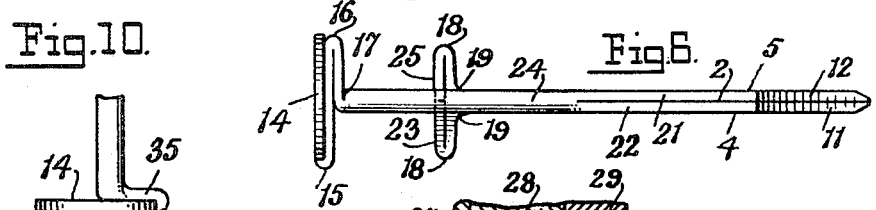
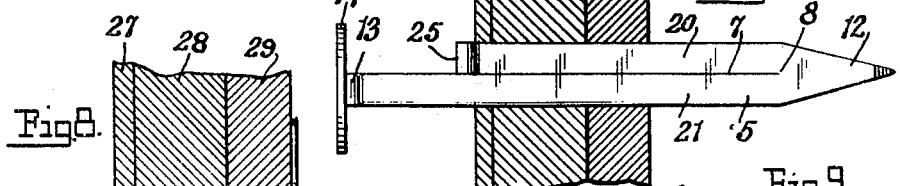
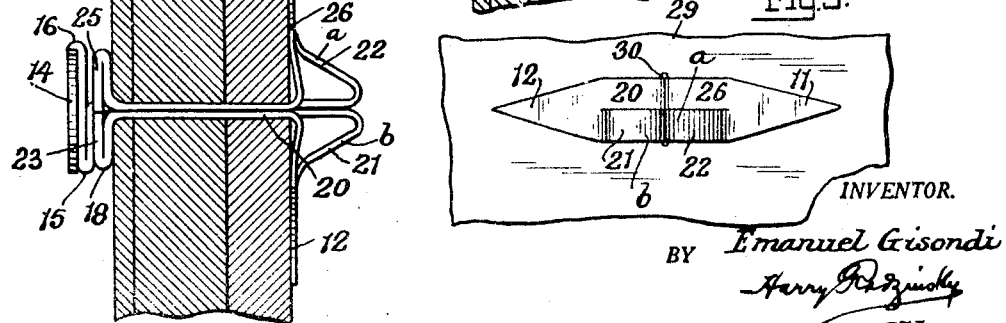
INVENTOR.
Emanuel Gisondi
BY Harry Radzinsky
Attorney Patented Sept. 23, 1947

2,427,959

UNITED STATES PATENT OFFICE 2,427,959

NAIL

Emanuel Gisondi, Larchmont, N. Y.

Application October 25, 1944, Serial No. 560,245

4 Claims. (Cl. 85—31)

This invention relates to fastening devices, and particularly to a nail-like fastener adapted to be forced or driven through one or more layers of material and extend at the back thereof and have parts or prong-like extensions bent over in opposite directions to thereby "clench" the nail and prevent it from being inadvertently displaced or withdrawn.

An object of the invention is to provide a fastener of the type described in which a bending-over or clenching action at the back of the material is automatically secured by merely driving the nail completely into position to bring its head into contact with the outer surface of the material.

Another object of the invention is to provide means by which the prongs or legs of the fastener are bent outwardly in opposite directions and against the back of the material, and by which said bent-over parts are angularly braced and strongly held against retractive bending.

At the present time many low-density sheet materials are being used for building construction, and one of the difficulties encountered in using such materials is the inability of ordinary nails and similar driven fasteners to securely anchor themselves in the soft, fibrous sheet materials of this kind. Consequently, the fastening together of several layers of material, such as, for example, the securement of shingles to fibrous wall board, has been found very difficult, and the fastening devices ordinarily employed for such work have either been unsatisfactory or very time-consuming to use. The optimum sought in a fastener for use for the purpose mentioned, and for similar uses, is the ability to be handled, used and driven in the manner of an ordinary nail, yet which will so anchor itself that it will securely and tenaciously hold itself in place and can only be removed with manual effort and suitable tools. The present invention therefore contemplates the provision of a fastener of the character above mentioned, which can not only be inserted with the facility of an ordinary nail, but which will not damage or distort the material through which it is driven, and which will clench or bend over in back of the material by simply driving it in place, so that its removal without tools and considerable manual effort will be impossible.

While I have herein described the improved nail as being particularly adapted for use in building construction, this is only one of the numerous uses to which it can be put, since it will be obvious that it may be employed for any purpose requiring a secure, self-clenching or self-locking nail, which can be driven in like an ordinary nail, but which will effectively lock itself in place by spread and reinforced parts at the back of the material through which the nail is driven.

In the accompanying drawing, wherein an illustrative embodiment of the invention is shown, Fig. 1, is a face view of the sheet-metal blank from which one of the improved fasteners or nails is constructed; Fig. 2 is a side view of the completed nail; Fig. 3 is a sectional view on the line 3—3 of Fig. 2, looking in the direction of the arrows; Fig. 4 is a top plan view of the nail; Fig. 5 is a sectional view on the line 5—5 of Fig. 4, looking in the direction of the arrows; Fig. 6 is a bottom view of the nail; Fig. 7 shows the nail partly driven through several layers of sheet material and before the spreading action has taken place; Fig. 8 is a sectional view taken at right angles to the view of Fig. 7, and showing the nail driven home and the prongs or legs fully spread apart against the back of the material through which the nail has been driven; Fig. 9 is a face view of the back of the material through which the nail has been driven, showing the bent-over prongs or legs of the nail, and Fig. 10 is a view showing a slightly modified form of head.

The improved fastening device or nail is preferably, but not necessarily, constructed from sheet metal, and in the form shown it is made from a stamped-out blank such as is shown at 1 in Fig. 1. The blank is in the form of an elongated strip having two somewhat similarly shaped halves 4 and 5 which are, in the formation of the nail, folded into contiguous relation along the central fold line 24, the blank being split as at 2, along this line, for a portion of its length from a point located between the pointed ends 11 and 12 of the two halves to the point designated at 3 in Fig. 1.

The half-portion indicated at 5 is slit longitudinally as shown at 7, from its rear end 6 to the point 8 located a short distance from the tip 12. This slitting of the part 5 as above explained, serves to divide said part into two strip-like sections or tongues indicated at 20 and 21. The portion shown at 4 is similarly slit, as indicated at 9, the outer termination of the slit 9 being indicated at 10. Part 4 is thus divided, for a portion of its length, into the two strip-like sections or tongues indicated at 22 and 26.

The tongue or strip 22 is formed with an integral extension or neck 13 terminating in a disk 14 which forms the main head of the nail. In the formation of the nail, this extended part or neck 13 is folded on the several transverse fold lines 15, 16 and 17 so that the neck portion 13 when so folded, extends once across the underside or back face of the head 14 and then extends to a central point from whence it projects rearwardly, as clearly seen in Figs. 4 and 6. This arrangement greatly reinforces the head 14 of the nail and can be used in instances when the nail is intended to be driven through relatively hard or resistant materials. Where great rigidity and stiffness of the head 14 is not required, the neck portion 13 can be made shorter and can be bent over in the manner indicated at 35 in Fig. 10 to thus provide a head-reinforcement of single thickness.

The two halves 4 and 5 are brought together or in face-to-face contact, by folding the blank along the central fold line 24, the two halves 4 and 5 being free of connection to one another from the point designated at 3 to the tips 11 and 12.

A head or abutment 25 is provided on the section 20 by bending the same transversely on the lines 18 and 19, this serving to produce a lateral or transverse extension. Similarly, the section or strip 26 is folded on the lines 18 and 19 to produce a projection or supplemental head 23.

The result of the operations heretofore described will be seen in Figs. 2 to 6 inclusive, wherein it will be noted that a sheet-metal nail is provided which has two double-thickness legs joined in a certain manner near their pointed ends. That is to say, a short leg is provided which consists of the two contiguous strip sections 20 and 26, and a longer leg is provided which consists of the two sections 21 and 22. The head for the longer leg is the disk 14, while the head for the short leg consists of the two members 23 and 25, this latter head being located for some distance rearwardly of the head 14.

From the foregoing, the operation of the nail or fastener will be readily understood. At 27, 28 and 29 is shown a number of layers of sheet material to be fastened together. The materials are nail-penetrable, and the nail is driven through them in the conventional manner such as by blows from a hammer. As the nail is driven through the materials, it produces an aperture 30. The nail is necessarily longer than the joint thickness of the several layers of material through which it is driven so that the pointed ends 11 and 12 and parts of the sections 4 and 5 will project beyond the back face of the materials. When the nail has been partly driven through the materials, the head on the short leg, said head consisting of the co-operating abutments 23 and 25, will come into contact with the outer face of the material, as shown in Fig. 7, thus preventing further penetration of the short leg, which as previously explained, consists of the parts 20 and 26. As further driving of the nail continues, the head 14 is driven home, or brought into contact with the parts 23 and 25 as shown in Fig. 8, the longer leg, consisting of the parts 21 and 22, will continue inward or penetrating movement, causing bending over of the parts 20 and 26 in a direction away from one another as shown in Fig. 8. Parts 21 and 22 are projected beyond the bent-over parts of the sections 20 and 26, and said parts 21 and 22 thus form angular, truss-like portions or braces a and b (Figs. 8 and 9) which greatly stiffen and reinforce the bent-over ends of the parts 20 and 26 and hold them against retractive bending.

It will be seen from the foregoing, that a nail is provided in which a simple driving movement serves to not only cause the nail to penetrate the one or more layers of material through which it is driven, but which cause the parts or plies of the nail which protrude at the back of the material to be bent over or clenched in opposite directions and rigidly braced in such bent-over position. The result is that a nail, inserted as described, will not become displaced and can only be removed with a tool.

The shape, size, and details of construction of the nail can be varied in many ways as will be apparent to those skilled in this art, since some of the details of construction of the nail are dependent upon the nature of the materials through which the nail is to be driven. In this connection it is to be noted that the points on which the parts of the nail bend over at the back of the material, are determined by the thickness of the material through which the nail is driven. That is to say, the protruding parts will bend over at the points where they emerge from the material, as is clearly seen in Fig. 8. Thus, the nail adjusts itself automatically to materials of different thickness through which it is driven.

While I have shown one embodiment of the invention, it is obvious that the same is not to be restricted thereto but is broad enough to cover all structures coming within the scope of the annexed claims.

What I claim is:

1. A nail having a pair of leg portions, one of said leg portions being longer than the other and being located to one side of the other, each leg portion having a head, each leg portion being of double thickness, the head on the shorter leg portion acting to limit the extent of penetration of the shorter leg portion through material, the longer leg portion being capable of additional inserting movement through the material, the effect of the latter movement causing parts of the short and longer leg portions to spread apart in opposite directions at the back of the material through which the nail is driven.

2. A nail having a pair of connected legs, one of said legs being shorter than the other and being located to one side of the other, each leg being of no more than double thickness, the short leg having an abutment limiting its extent of penetration through material, the longer leg having a supplemental movement relative to the short leg, said supplemental movement acting to spread the thicknesses of both legs apart and in opposite directions at the back of the material through which the nail is driven.

3. A nail having a flat wide shank portion consisting of an elongated strip of sheet metal folded longitudinally upon itself to form the shank into two plies, a head at one end of the shank and a point at the opposite end, the two-ply shank being split longitudinally from the head to a position adjacent to the pointed end thereby dividing the shank for a portion of its length into a pair of sections each being of two-ply construction, said sections being disposed in the same flat plane, one of said sections being shorter than the other and having a head located at a distance from the first head and situated between said first head and the pointed end of the shank.

4. A nail having a flat wide shank portion consisting of an elongated strip of sheet material folded longitudinally upon itself to form the entire shank into two plies only, a head at one end of the shank consisting of an extended part of one of the plies doubled over upon itself and having a disk-shaped terminal, a point at the opposite end of the shank, the two-ply shank being split longitudinally from the head to a position adjacent to the pointed end thereby dividing the shank for a portion of its length into a pair of sections each being of two-ply construction one of said sections being located to one side of the other, said sections being disposed in the same flat plane, one of the sections being shorter than the other and having a head located at a distance from the first head and situated between said first head and the pointed end of the shank, the second head consisting of laterally extended and doubled-over parts of the two plies of the short section of the shank.

EMANUEL GISONDI.

REFERENCES CITED

The following references are of record in the file of this patent:

UNITED STATES PATENTS

| Number | Name | Date |
|---|---|---|
| 964,226 | Farrand | July 12, 1910 |
| 1,031,431 | Dunn | July 2, 1912 |
| 1,203,669 | Whiteside | Nov. 7, 1916 |
| 1,336,162 | Royer | Apr. 6, 1920 |
| 1,783,248 | Loucks | Dec. 2, 1930 |
| 2,333,930 | Hedström | Nov. 9, 1943 |